March 19, 1968
J. M. COOK
3,374,375
ACCELERATION SENSITIVE COUPLING
Filed Aug. 3, 1964
2 Sheets-Sheet 1
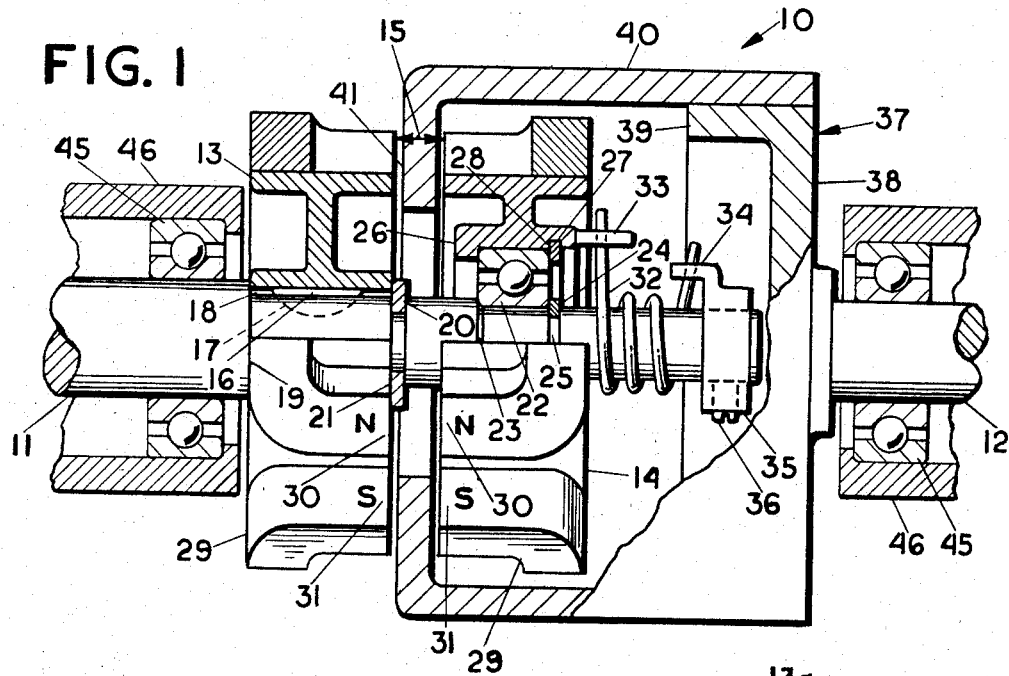
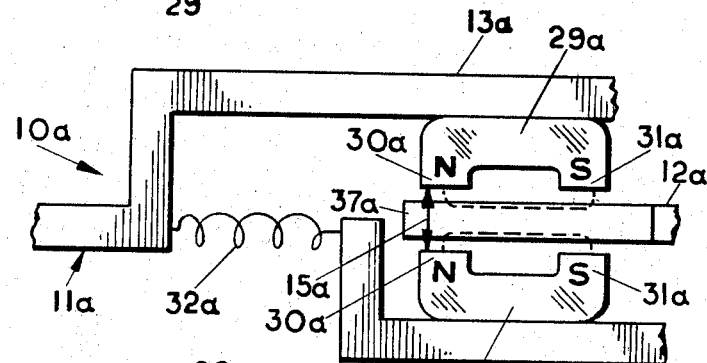
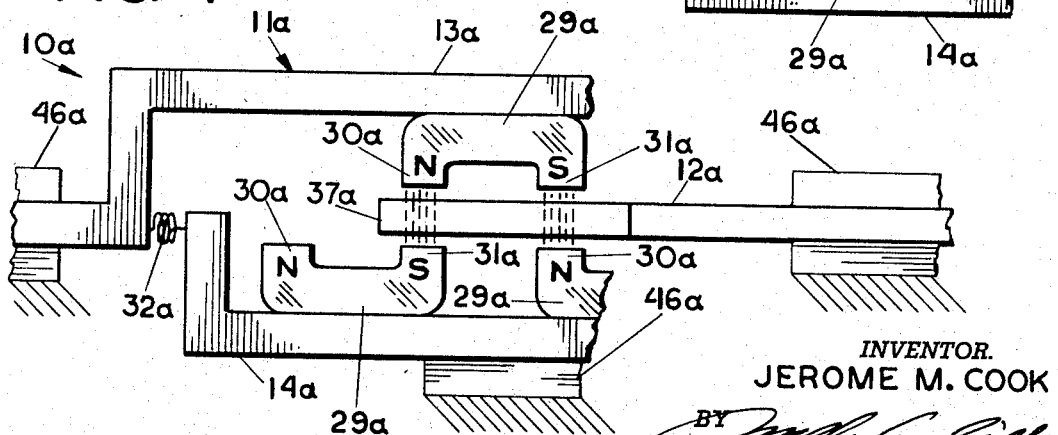
INVENTOR.
JEROME M. COOK
ATTORNEY March 19, 1968  J. M. COOK  3,374,375
ACCELERATION SENSITIVE COUPLING
Filed Aug. 3, 1964  2 Sheets-Sheet 2

INVENTOR.
JEROME M. COOK
BY
ATTORNEY 3,374,375
ACCELERATION SENSITIVE COUPLING
Jerome M. Cook, Plainview, N.Y., assignor to Grumman Aircraft Engineering Corporation, Bethpage, N.Y., a corporation of New York
Filed Aug. 3, 1964, Ser. No. 387,096
12 Claims. (Cl. 310—95)

ABSTRACT OF THE DISCLOSURE

This invention is a magnetic eddy-current coupling in which the torque coupling between the drive and driven members is a function primarily of drive member acceleration. Maximum coupling effect is obtained in conditions of maximum drive member acceleration and the effect drops to zero when the drive member ceases to accelerate as, for instance, when it stabilizes at its rated speed. Variations in the magnetic field to vary the coupling effect are obtained by a displacement in the relative positions of the field producing elements of the drive. This displacement is produced by the inertia induced by acceleration. The operating principle is applicable in linear as well as rotary couplings.

---

Figure 2:
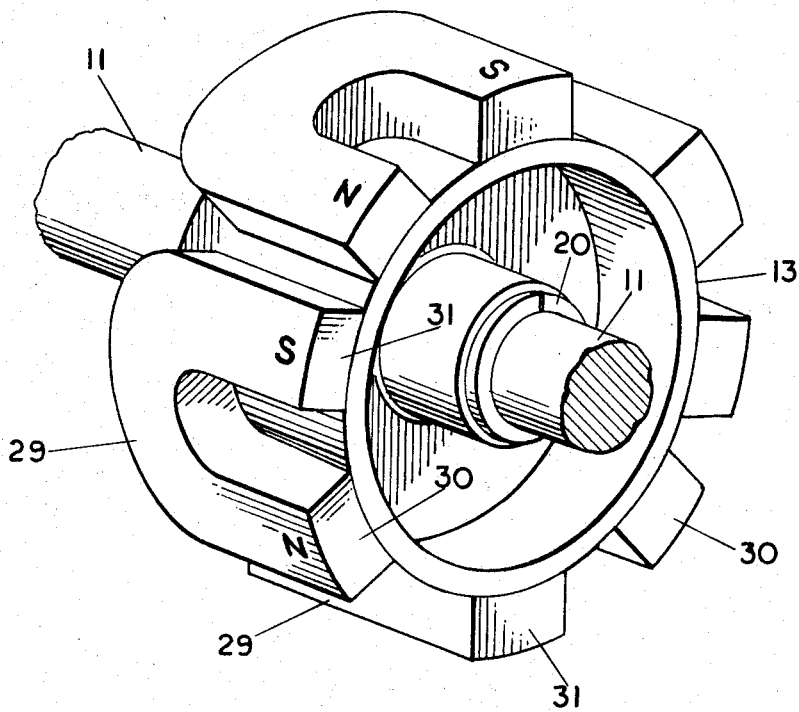

This invention relates to couplings and more particularly to an acceleration sensitive coupling whereby movement of a drive is transmitted to a driven member only under conditions of acceleration, i.e. velocity change of the drive, and such transmitted movement is proportional to the velocity differential between the drive and driven members.

Among other things the present invention contemplates a coupling based on known magnetic principles to effect the operative connection and disconnection of its drive and driven components. Combined with such magnetic principles are known inertia principles by which this coupling is sensitive only to acceleration or velocity changes which distinguishes it from couplings heretofore known to the art.

Thus, the coupling herein proposed is not only acceleration sensitive but is so constructed that its operating components are devoid of physically contacting elements rendering it quiet and smooth in service with virtually unlimited life. At the same time this construction is such as to lend itself to the manufacture of a rugged, uncomplicated device having a relatively wide range of sensitivity that is adjustable within predetermined limits. Its utility therefore is general, finding application in a variety of devices such as indicators, control actuators and wherever it is desired to couple a drive and a driven member in response to acceleration conditions.

In essence, the coupling herein proposed comprises a magnetic field-producing element carried by the drive member and disposed adjacent the driven member. Normally, this element is disposed so as to locate its associated magnetic field in a selected direction relative to the driven member producing a magnetic force of predetermined intensity operative thereon. However, a control responsive to acceleration of the drive member is provided to adjust the position of the element to change its associated magnetic field direction accordingly and thereby vary the magnetic force intensity operative on the driven member. This effectively connects and/or disconnects the driven member to and/or from the drive.

More specifically, the magnetic field-producing element is preferably formed by at least one magnet disposed on each side of the driven member whereby each such pair of associated magnets constitutes a complementary set. One magnet of each such set is immovably secured to the drive member while its companion magnet is mounted thereto for limited relative movement, being normally disposed by appropriate biasing means with its poles in a preselected position of alignment with the poles of the first magnet. The biasing means is adapted to be overpowered by predetermined forces imposed thereon by acceleration or velocity changes. Thus, the relative position of the corresponding poles of each magnet pair are adjusted with an attendant change in the direction of the associated magnetic field and its force operative on the driven member. When poles of the magnets on one side are brought closer to unlike poles of magnets on the other side and eventually into alignment, the magnetic field strength therebetween increases causing an increase in the connection or coupling of the drive to the driven member.

With the above and other objects in view, as will be apparent, this invention consists in the construction, combination and arrangement of parts, all as hereinafter more fully described, claimed and illustrated in the accompanying drawings, wherein:

FIG. 1 is a longitudinal view partially in section of a coupling designed and constructed in accordance with the teachings hereof as applied to a rotary motion device showing the complementary or coacting magnets comprising the magnetic field-producing element of the drive member in position with like poles aligned whereby no movement is imparted to the driven member, i.e. the drive and driven members are operatively disengaged;

FIG. 2 is an isometric view of that portion of the drive member shown in FIG. 1 to which one magnet of each complementary set of magnets is immovably secured.

FIG. 3 is a longitudinal fragmentary view in schematic of a coupling designed in accordance with the teachings hereof as applied to a linear motion device showing the magnetic field-producing element of the drive member in a position corresponding to that of FIG. 1; and FIG. 4 is a similar view to show the magnetic field-producing element of the drive member in its other extreme position whereby the drive and driven members are operatively engaged for movement in unison.

Referring more particularly to the drawings, 10 designates an acceleration sensitive coupling for rotary motion devices, i.e. where the drive and driven members of the coupling are mounted for rotation. The coupling 10 is disposed between a rotary drive shaft 11 and a rotary driven shaft 12, each individually mounted such as by ball bearings 45 to fixed structure 46 to project therefrom and occupy positions of coaxial alignment one with the other.

Adjacent its outer end, the drive shaft 11 is provided with a pair of spaced wheels 13 and 14. The wheel 13 is secured for rotation with the shaft 11 by means of and through a key 16 provided in slot 17 in the shaft 11 to mate with a corresponding groove or recess 18 in the wheel 13. The wheel 13 is additionally secured against axial movement on the shaft 11, being engaged between a shoulder 19 formed on the shaft 11 and a lock ring 20 adapted to be removably seated in a circumferential groove 21 in the shaft 11 and to act in opposition to the shoulder 19.

The wheel 14 is rotatably mounted on the shaft 11 by means of and through appropriate anti-friction means in the form of a ball bearing 22. To this end a shoulder 23 is formed on the shaft 11 to abut one side of the inner race of bearing 22 and act in opposition to a lock ring 24 removably seated in a circumferential groove 25 in the shaft 11 on the other side of the inner race. The inner periphery of the wheel 14 is mounted on the outer race of bearing 22 being held in place between a lateral flange 26 projecting therefrom to abut one side of the outer race and act in opposition to a lock ring 27 removably seated in a groove 28 in the wheel 14 at the other side of the outer race.

The wheels 13 and 14 each carry a magnetic field-producing element having lines of force operative in the gap 15 indicated by the double-ended arrow. Preferably each such element comprises a plurality of horseshoe magnets 29 secured in any conventional manner to the outer periphery of each wheel 13 and 14 in equidistant, spaced relation one to the other with their North 30 and South 31 poles in sequential, alternating position and facing the gap 15.

Biasing means in the form of a torsion spring 32 is provided between the shaft 11 and the rotatably mounted wheel 14 to normally maintain it in a fixed position relative to the wheel 13. Thus, the poles 30 and 31 of the magnets 29 carried by the respective wheels 13 and 14 may be prepositioned relative to each other. When like poles 30 and 31 of the magnets carried by both wheels 13 and 14 are thereby aligned, magnetic lines of force are established between adjacent poles 30 and 31 of the magnets carried by the wheel 13 and between adjacent poles 30 and 31 of the magnets carried by the wheel 14, i.e. longitudinally of the gap 15. On the other hand when unlike poles 30 and 31 of the magnets carried by both wheels 13 and 14 are aligned, magnetic lines of force are established across the gap 15. Intermediate relative positions of the poles 30 and 31 of the magnets of the respective wheels 13 and 14 will produce magnetic lines of force having intermediate directions relative to the gap 15 and corresponding values of field strength therein.

To the above ends the torsion spring 32 is mounted on the shaft 11 with each of its opposite ends projecting therefrom and engaged in an aperture provided therefor in respective projections 33 and 34 secured to or carried by the wheel 14 and shaft 11. The projection 33 may be integrally formed on the adjacent side of the wheel 14, while the projection 34 may be integrally formed on a collet 35 removably secured, as for example by a set screw 36, to the shaft 11 at the outer end thereof.

The rotary driven shaft 12 terminates in an extension formed by a cup-like enlargement 37 fixedly secured thereto in any conventional manner to be disposed concentrically thereon and to overlie and surround the outer end of the drive shaft 11. To facilitate this assembly the enlargement 37 may comprise a disc 38, concentrically secured to the end of the shaft 12 and terminating in a lateral flange 39 projecting therefrom toward the shaft 11. The marginal edge portion of a sleeve 40 abuts and is mounted to the outer surface of the flange 39 in any appropriate manner so as to become in effect an integral extension thereof. At its outer end the sleeve 40 is formed or otherwise provided with an inwardly turned flange 41 adapted to be disposed at all times in the gap 15. Thus, the sleeve 40 including its flange 41 forms an integral part of the shaft 12 and is fabricated of electrically and thermally conductive material.

From the foregoing it should be apparent that rotation of the drive shaft 11 results in the concurrent rotation of the wheel 13 and its several magnets 29. Normally such rotation also results in the concurrent rotation of the wheel 14 with shaft 11 through spring 32. Thus, the preset relative position of the poles 30 and 31 of the complementary magnets 29 of wheels 13 and 14 and the normally low value of the magnetic field strength in the gap 15 is established and maintained so long as the shaft 11 rotates at a constant velocity. It will be appreciated that this small magnetic field strength has only a limited coupling effect on the flange 41 of the driven shaft 12 and there is no torque transmitted to the driven shaft.

When, however, the rotational velocity of the shaft 11 changes, i.e. acceleration occurs, inertia forces acting on the wheel 14 reach a magnitude sufficient to overpower the normal action of the spring 32 causing relative rotation of, or slippage between, the wheels 13 and 14. The poles 30 and 31 of the complementary magnets 29 of wheels 13 and 14 are thereby moved out of their preset relative position and the magnetic field strength in the gap 15 is altered accordingly.

Assuming, for example, that like poles 30 and 31 of complementary magnets 29 of the wheels 13 and 14 are aligned in the preset relative position, the normal magnetc field would be disposed in a longitudinal position relative to the gap 15, with only small amounts of flux crossing the gap 15. Under conditions of acceleration the poles 30 and 31 of the magnets on the respective wheels 13 and 14 would rotate relative to each other to an extreme position where unlike poles 30 and 31 of the magnets on the wheels 13 and 14 would align. At this time the magnetic lines of force are established across the gap 15 and the magnetic field strength in the gap 15 would, therefore, have changed from minimum to maximum. With the maximum field strength across the gap 15, the flux lines passing through the flange 41 will induce a voltage and current in that flange that will produce the maximum coupling effect such that the maximum torque is transmitted through the coupling to the output shaft 12, thus resulting in rotation of the output shaft.

The sensitivity of the coupling 10, i.e. the amount of acceleration necessary to move the poles 30 and 31 of the magnets on the respective wheels 13 and 14 out of their normal or preset relative position may be readily adjusted by employing springs 32 of different inherent strength. Hence, a relatively weak torsion spring 32 would respond to relatively small changes in velocity. Moreover, the preset relative position of the poles 30 and 31 on the respective wheels 13 and 14 is readily adjustable by selectively setting the angular position of the collet 35 on the shaft 11. This is accomplished by means of and through the set screw 36.

FIGS. 3 and 4 show schematically the acceleration sensitive coupling contemplated by the present invention as applied to linear motion devices. In this case the coupling 10a is disposed between drive and driven members 11a and 12a respectively, each individually mounted in conventional manner to associated structure by means of guide blocks 46a for unrestricted reciprocating movement and projecting therefrom with their ends in spaced, overlapped relation.

Adjacent its outer end, the drive member 11a is provided with a pair of spaced magnetic carrying supports 13a and 14a having adjacent surfaces that align one with the other. The support 13a is integrally formed on the drive member 11a while biasing means in the form of a spring 32a connect the free end of the support 14a to the drive member 11a to normally maintain it in a fixed position relative to the support 13a. The supports 13a and 14a each carry a magnetic field-producing element, preferably comprising a plurality of horseshoe magnets 29a secured in any appropriate manner to the adjacent, aligned surfaces of the supports 13a and 14a in equidistant, spaced relation one to the other with their North 30a and South 31a poles in sequential, alternating position. The poles 30a and 31a of the magnets 29a thus carried by one support 13a or 14a face the poles 30a and 31a of the magnets 29a carried by the other support and coact therewith to define a gap 15a indicated by the double-ended arrow. Thus the poles 30a and 31a of the magnets 29a carried by the respective supports 13a and 14a may be prepositioned relative to each other. When like poles 30a and 31a of the magnets carried by both supports 13a and 14a are thereby aligned, magnetic lines of force are established between adjacent poles 30a and 31a of the magnets carried by the support 13a and between adjacent poles 30a and 31a of the magnets carried by the support 14a, i.e. longitudinally of the gap 15a as shown by the dotted lines in FIG. 3. On the other hand, when unlike poles 30a and 31a of the magnets carried by both supports 13a and 14a are aligned, magnetic lines of force are established across the gap 15a as shown by the dotted lines of FIG. 4. Intermediate relative positions of the poles 30a and 31a of the magnets of the respective supports 13a and 14a will produce magnetic lines of force having intermediate directions relative to the gap 15a and corresponding values of field strength therein.

The driven member 12a terminates in an integral extension 37a of electrically and thermally conductive material adapted to be disposed in the gap 15a. It will be appreciated, of course, that extension 37a will be operatively affected by the magnetic fields established in the gap 15a by the magnets 29a.

Upon reciprocation of the drive member 11a and the attached magnets 29a at a constant or uniform speed, the support 14a and the attached magnets 29a reciprocate concurrently therewith due to the connection therewith through the spring 32a. Thus the preset relative position of the poles 30a and 31a of the respective magnets 29a of the supports 13a and 14a and the normally low value of the magnetic field strength in the gap 15a is established and maintained so long as the drive 11a moves at the same velocity.

When, however, the velocity of the drive member 11a changes, i.e. acceleration occurs, inertia forces acting on the support 14a reach a magnitude sufficient to overpower the normal action of the spring 32a, causing relative movement between the supports 13a and 14a. The poles 30a and 31a of the respective magnets 29a of supports 13a and 14a are thereby moved out of their preset relative position and the magnetic field strength in the gap 15a is altered accordingly. Thus, the resulting voltage and current induced in the extension 37a which operates in that gap will produce a coupling effect such that a force is transmitted to the driven member 12a, causing that member to follow the movement of the drive member 11a.

The sensitivity of the coupling 10a, i.e. the amount of acceleration necessary to move the poles 30a and 31a on the respective supports 13a and 14a out of their normal or preset relative position may be readily adjusted by employing springs 32a of different inherent strength or resiliency. Also, the preset relative position of the poles 30a and 31a on the respective supports 13a and 14a is readily adjusted by a selection of spring length.

Although shown and described in what is believed to be the most practical and preferred embodiments, it is apparent that departures from the specific construction shown will suggest themselves to those skilled in the art and may be made without departing from the spirit and scope of the invention. I therefore do not wish to restrict myself to the particular constructions illustrated and described, but desire to avail myself of all modifications that may fall within the scope of the appended claims.

Having thus described my invention, what I claim is:

1. An acceleration sensitive coupling operative between a drive and a driven member comprising a magnetic field-producing element carried by said drive, an extension fabricated of an electrically and thermally conductive material carried by said driven member and disposed at all times in the magnetic field produced by said element, and means responsive to a change in velocity of said drive to alter the position of said element and thereby change the direction of said magnetic field relative to said extension.

2. The coupling of claim 1 including biasing means normally operative on said element to maintain said magnetic field in a preselected direction relative to said extension.

3. The coupling of claim 2 wherein said biasing means comprises adjustable resilient means to establish the said preselected direction.

4. The coupling of claim 2 including an adjustable operative connection between said biasing means and said drive.

5. An acceleration sensitive coupling operative between a drive and a driven member comprising a magnetic field-producing element carried by said drive, said element including a fixed component and a relatively movable component mounted on an inertia responsive support and separated from said fixed component by a gap, an extension fabricated of an electrically and thermally conductive material carried by said driven member and disposed in said gap and being at all times in the magnetic field produced by said element, and means responsive to a change in velocity of said drive to alter the position of said element and thereby change the direction of said magnetic field relative to said extension.

6. The coupling of claim 5 wherein said fixed component and said movable component each comprises a plurality of magnets having North and South poles arranged in sequential, alternating relation, the direction of said magnetic field being substantially longitudinal of said gap when like magnetic poles of said fixed and movable components align and being substantially across said gap when unlike magnetic poles of said fixed and movable components align.

7. An acceleration sensitive coupling operative between a rotary drive and a rotary driven member comprising at least one pair of spaced magnets carried by said drive and having their poles facing each other to define a gap therebetween, one magnet of each pair being secured to said drive and the other magnet of each pair being rotatably mounted thereon, an extension of electrically and thermally conductive material carried by said driven member and disposed in said gap, and a resilient connection between said other magnet and said drive whereby each other magnet is disposed and maintained in a selected position on said drive with its poles in a predetermined position relative to the poles of each said one magnet during rotation of said drive at a constant velocity.

8. The coupling of claim 7 wherein said resilient connection comprises a torsion spring mounted for adjustment on said drive whereby the relative positions of the poles of said magnets are established.

9. The coupling of claim 7 wherein said resilient connection includes an engagement secured to said other magnet and an engagement secured to said drive, and a torsion spring of predetermined resiliency having opposite ends removably secured in each of said engagements.

10. The coupling of claim 7 wherein said drive and said driven member comprise rotary shafts mounted in coaxial alignment, and said extension comprises a cup-like enlargement concentrically projecting from the driven shaft to overlie and surround the end of the drive shaft and terminating in a flange disposed in said gap.

11. An acceleration sensitive coupling operative between a drive member and a driven member, each individually mounted for unrestricted reciprocation comprising at least one pair of space magnets carried by said drive member and having their poles facing each other to define a gap therebetween, one magnet of each pair being secured to said driven member and the other said magnet of each pair being mounted for movement relative thereto, an extension of electrically and thermally conductive material carried by said driven member and disposed in said gap, and a resilient connection between said other magnet and said drive member whereby each said other magnet is disposed and maintained in a selected position on said drive member with its poles in a predetermined position relative to the poles of each said one magnet during reciprocation of said drive at a constant velocity.

12. The coupling of claim 11 wherein each said one magnet is carried by a support integrally formed on and projecting from said drive member and each said other magnet is carried by an independent support, and said resilient connection comprises a spring connected at its respective opposite ends to said supports.

References Cited

UNITED STATES PATENTS

| 2,381,225 | 8/1945 | Newell | 200—61.46 X |
| 2,537,335 | 1/1951 | Edwards | 310—95 |
| 2,717,675 | 9/1955 | Smith | 310—95 |

DAVID X. SLINEY, *Primary Examiner.*

UNITED STATES PATENT OFFICE
CERTIFICATE OF CORRECTION

Patent No. 3,374,375                                  March 19, 1968

Jerome M. Cook

It is certified that error appears in the above identified patent and that said Letters Patent are hereby corrected as shown below:

Column 4, line 56, for "magnetic" read -- magnet --; column 6, line 42, for "each other magnet" read -- each said other magnet --; line 65, for "space" read -- spaced --; line 68, for "driven" read -- drive --.

Signed and sealed this 24th day of June 1969.

(SEAL)
Attest:

Edward M. Fletcher, Jr.                            WILLIAM E. SCHUYLER, JR.
Attesting Officer                                       Commissioner of Patents